United States Patent
Wiegand et al.

[19]

[11] Patent Number: 6,084,724
[45] Date of Patent: Jul. 4, 2000

[54] GLASS COATED CEMENTED PLASTIC DOUBLETS AND METHOD FOR MAKING

[75] Inventors: Philip J. Wiegand; Lee R. Estelle; Alan E. Lewis, all of Rochester, N.Y.

[73] Assignee: Eastman Kodak Company, Rochester, N.Y.

[21] Appl. No.: 08/175,893

[22] Filed: Dec. 30, 1993

[51] Int. Cl.[7] .............................. G02B 9/00; G02B 27/00; G02C 7/02
[52] U.S. Cl. .............................. 359/796; 156/99; 351/166
[58] Field of Search ................ 359/796; 156/99; 351/166

[56] References Cited

U.S. PATENT DOCUMENTS

| | | | |
|---|---|---|---|
| 1,948,636 | 2/1934 | Tillyer | 156/99 |
| 2,092,789 | 9/1937 | Tillyer | 156/99 |
| 2,382,660 | 8/1945 | Penberthy | 156/99 |
| 2,453,218 | 11/1948 | Grey | 359/795 |
| 2,777,364 | 1/1957 | Murray | 359/796 |
| 3,953,652 | 4/1976 | Addiss, Jr. et al. | 428/412 |
| 3,991,234 | 11/1976 | Chang et al. | 427/164 |
| 4,577,935 | 3/1986 | Yamakawa et al. | 359/651 |
| 4,690,512 | 9/1987 | Forsyth | 359/796 |
| 4,883,548 | 11/1989 | Onoki | 156/99 |
| 4,892,403 | 1/1990 | Merie | 156/99 |
| 4,927,480 | 5/1990 | Vaughan | 156/99 |
| 4,948,447 | 8/1990 | Clarke et al. | 156/99 |
| 5,107,371 | 4/1992 | Shibata et al. | 359/642 |
| 5,253,111 | 10/1993 | Chiba et al. | 359/647 |

FOREIGN PATENT DOCUMENTS 0287601  11/1989  Japan ...................... 359/796

Primary Examiner—Georgia Epps
Assistant Examiner—Evelyn A. Lester
Attorney, Agent, or Firm—Svetlana Z. Short

[57] ABSTRACT

A lens component comprising a first plastic lens element having a thin glass coating and a second lens element cemented to the glass coated surface of the first plastic element.

13 Claims, 1 Drawing Sheet

GLASS COATED CEMENTED PLASTIC DOUBLETS AND METHOD FOR MAKING

BACKGROUND OF THE INVENTION

1. Field of the Invention

The present invention relates to composite lens assemblies in general, and in particular, to such assemblies and methods for assembling in which plastic lens elements are adhesively bonded to other plastic lens elements or to glass elements.

2. Description Relative to Prior Art

Image forming plastic lens elements have, of course, been used for many years. Sometimes a single plastic lens element is all that's required. Other requirements dictate that a combination of two or more plastic elements must be used in a lens design to correct for Seidel and chromatic aberrations, and to meet other lens requirements. In addition to this, in multi-elements lens systems, it is often desired to cement two elements together and form what is commonly called a cemented doublet. Cemented doublets are desirable when certain lens designs require that two lens elements be placed in intimate contact or almost intimate contact. Cementing the two elements maintains alignment and more importantly reduces the reflections at the two surfaces to be cemented. The result is an increase in transmission and subsequent improvement in image contrast.

The design of plastic lens systems has been limited, in part, by the inability to cement plastic doublets in production. Where such assemblies require bonding of the plastic elements or a plastic element to a glass element by an optical cement, difficulties sometimes arise in establishing or maintaining a physically firm and stable bond between the plastic element and the glass element or between the plastic elements. That is to say, the plastic and the cement are incompatible in the sense that sooner or later any bond initially established between them may be adversely affected in a manner impairing its optical neutrality. For instance, while as a rule stable bonds may be established between glass elements and optical cements, it has been found that the bonding of plastic elements by optical cements to glass elements or other plastic elements is often impaired by partial or total separation, crazes, fissures or cracks in the cement, etc., for reasons sometimes rooted in their different coefficients of expansion under conditions of changing temperatures or, generally, because of their lack of compatibility. Much recent work had been devoted to special cements that are suitable for cementing plastic surfaces to each other. U.S. Pat. No. 4,690,512 represents this trend or approach. The invention establishes a different approach to the solution of the above-mentioned problems.

SUMMARY OF THE INVENTION

It is therefore, an object of the invention to make possible a stable physical bond, between two or more plastic lens elements or between two or more plastic and glass elements.

Another object of the invention resides in the provision of a substantially stable bond of neutrality between lens elements of the kind referred to above that meets the environmental requirements imposed on camera lenses.

Yet another object of the invention is to provide permanent adhesive bonds of physical stability between at least two plastic elements or between at least one glass and one plastic lens element by simple and inexpensive means.

A still further object of the invention is to provide an improved bond between a cement and a plastic lens element which remains stable even over wide temperature ranges.

In the accomplishment of these and other objects, the invention, in its broadest aspect, provides for a lens component comprising a first, plastic lens element having a thin glass coating, and a second lens element cemented to said glass coating.

According to another aspect of the invention, a method of cementing a plastic lens element to another plastic lens element comprising: (i) coating a first plastic lens element with a layer of thin glass coating; (ii) coating a second plastic element with a layer of thin glass coating; and (iii) cementing said first glass coated plastic element to said second glass coated plastic element as if one was cementing ordinary glass elements.

DETAILED DESCRIPTION OF THE PREFERRED EMBODIMENT

Figure 1:
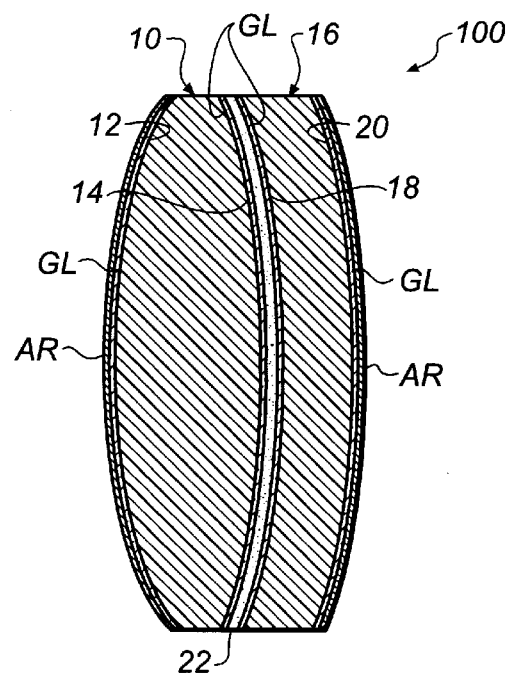
FIG. 1 is a cross-sectional view of a lens embodiment according to the present invention. The embodiment comprises two cemented plastic lens elements L1 and L2, each coated with a thin layer of glass GL.

The novel features representative of preferred embodiments of the invention are set forth with particularity in the appended claims. The invention itself, however, in respect of its organization and method of operation together with other objects and advantages will be best understood from the following description of an illustrative embodiment and the accompanying drawing which depicts a lens assembly 100, in longitudinal section, including two plastic lens elements (L1 and L2) cemented together. This preferred embodiment describes a cemented plastic doublet in which each optical surface of each lens element has been coated with a thin coating of optically clear glass material. As a result, the two lens elements may be cemented together using standard glass-to-glass optical cements. In addition, the glass coated surfaces are well suited to standard anti-reflective coatings. Also, plastic lens elements may be cemented to glass elements; again using standard glass-to-glass optical cements. Of course, plastic prisms, plates, mirrors, etc., may be coated with optically clear glass material and cemented to plastic and/or glass optical parts using the same process as described for the lens element.

The accompanying figure, by way of a preferred embodiment of the invention, depicts a plastic biconvex lens element 10 having a first convex surface 12 and a second convex surface 14. The term "plastic" is here used for convenience to refer to non-glass lens elements of organic polymers, and is intended to include, but not to be limited to, styrene and acrylic resin compounds. Also shown is a meniscus plastic lens element 16 adjacent the second convex surface 14 of lens element 10. As will be appreciated by those skilled in the art, although the element 16 is plastic, an equivalent lens element may be made of any of the many well-known optical glasses. Since the element 16 is made of plastic, it is treated in the manner of element 10, in the manner set forth infra. The lens element 16 (i.e. L2) is provided with optical surfaces 18 and 20, the curvature of the concave surface 18 being complementary to the second convex surface 14 of element 10 (i.e. L1). Indeed, the concave surface 18 faces the convex surface 14 in such a manner that the two lens elements 10 and 16 are coaxially aligned.

All optical plastic surfaces, i.e. surfaces 12, 14 and surfaces 18, 20, have a thin glass coating GL, usually 1 to 4 microns thick. Thicker coatings may be used, depending on the application. Surfaces 12 and 20 are also coated with an anti-reflection coating (AR), such as magnesium fluoride. The anti-reflection coating may be applied before or after the glass coating. The lens elements are cemented together by a standard cement 22 at the surfaces common to both lens elements, designated as 14 and 18 in the drawing.

The glass-coated surfaces 14 and 18 are separated by a gap of uniform width, and the gap is filled by a layer of cement 22 which, in the manner described below, maintains the lens elements 10 and 16 in their position relative to each other. Also discernible is a glass coating GL, represented by a thick black line, between the cement 22 and the convex surface 14 of the plastic lens element 10. As defined herein, a plastic lens element implies a lens element whose predominant composition is formed of a plastic material, i.e. an organic polymer. A similar glass coating GL is applied to the lens element 16, particularly since it is also made of plastic. The layer of cement 22 between the lens elements 10 and 16 is applied by any of the methods well known in the art. The exemplary dimensions and spacings are set in Table 1 below.

It should be noted that, the curvatures of the surfaces of the lens elements 10 and 16 will of course be different, depending on the application for which a cemented lens component will be used.

In accordance with the invention, the convex surface 14 of the plastic lens element 10 is treated by an application of a thin glass coating preferably less than 10 microns thin and more preferable 1–4 microns thin.

Figure 2:
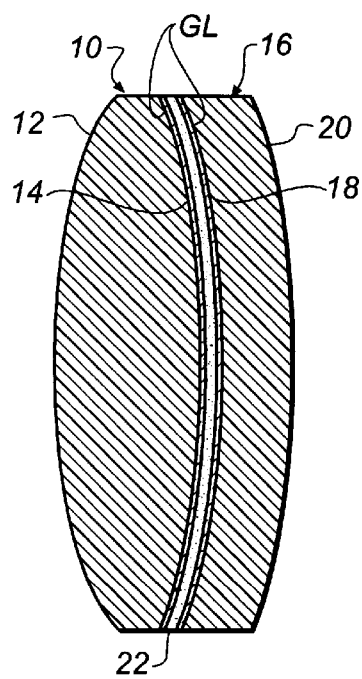
FIG. 2 is a cross-sectional view of another embodiment of the present invention.

The glass coating may be applied, by dipping or by spraying, or by a conventional thin coating method, to the surface of the plastic lens element and should thereafter by allowed to dry. The cement may then be applied, preferably in liquid condition, to the mating glass-coated surface such as the mating surface 14 or 18; and by pressing the lens element 16 against the convex surface 14 of the lens element 10 the cement is spread over both surfaces 14 and 16, thus forming a layer 22 of uniform thickness. Thereafter, it is allowed to dry or cure at room temperature, which is completed in about 24 hours or less. For reasons of efficiency, it is deemed to be desirable to apply the cement 22 to the concave lens surface. If in liquid form, the cement may be applied in drop form or by spraying, or in any other known manner. The bond established between the two lens elements should be as physically stable as the bond between any two glass elements, without affecting the optical neutrality of the cement layer 22. The glass coating on surfaces 12 and 20 (i.e. the front-most surface and the rear-most surface) of the cemented component is not required for achieving a stable bond between the plastic elements 10 and 16. This is illustrated in FIG. 2.

The specific parameters of the lens 100 shown in the accompanying Figure are provided in Table 1.

TABLE 1

| Surface | Radius | Thickness | Material |
|---|---|---|---|
| Glass Coating | 25.4734 | 0.002 | See Note 1 |
| 12 | 25.4734 | 4.500 | Plexiglass |
| 14, Glass Coating | −20.2942 | 0.004 | See Note 1 |
| 18, Glass Coating | −20.2942 | 2.000 | Polystyrene |
| 20, Glass Coating | −103.587 | 0.002 | See Note 1 |

NOTES:
1) Suggested glass coatings are Corning 7059 or Shot 8329. This example used Schott BK7.
2) Image surface is curved with radius −5.6221.

It is therefore, an advantage of the invention to make possible a stable physical bond, between two or more plastic lens elements or between two or more plastic and glass elements.

Another advantage of the invention resides in the provision of a substantially stable bond of neutrality between lens elements of the kind referred to above that meets the environmental requirements imposed on camera lenses.

Yet another advantage of the invention is to provide permanent adhesive bonds of physical stability between at least two plastic elements or between at least one glass and one plastic lens element by simple and inexpensive means.

A still further advantage of the invention is to provide an improved bond between a cement and a plastic lens element which remains stable even over wide temperature ranges.

Another limitation imposed on the design of the conventional plastic lens system is that there are relatively few optical grade plastic materials available from which a lens designer may select. This invention is advantageous because with this invention, it is possible for a lens designer to design glass-to-plastic cemented doublets. Thus, the designer has an advantage of a much greater selection of materials, that is optical grade glasses and different types of plastics, from which to select.

Those skilled in the art will appreciate that in the practice of the invention herein described, certain changes in the arrangements referred to may be made without departing from the spirit or scope of the invention. For instance, the invention is equally applicable to joining two plastic lens elements or, for that matter, elements which are not lenses.

The cemented component may be used on a stand-alone basis, or as part of the optical assembly which may be relatively simple or relatively complicated, as for example, a zoom lens system. In addition, one or more surfaces of the cemented component may be aspheric and such aspheric profile may be located either on a front or on a rear surface of the cemented lens component.

This invention is not limited to multiple lens elements being cemented together—according to this invention, a plastic component, such as a lens prism may be cemented to a lens element as well.

The invention has been described in detail with particular reference to a preferred embodiment thereof, but it will be understood that variations and modifications can be effected within the spirit and scope of the invention.

What is claimed is:

1. A lens component comprising:
   a plastic lens element having an internal surface covered with a thin glass coating; and
   another lens element cemented to said glass coating.

2. A lens component according to claim 1, wherein said glass coating is less than 4 µm thick.

3. A lens component according to claim 1, wherein both of said lens elements are plastic lens elements each of which is coated with a thin glass coating.

4. A lens component according to claim 3, wherein said glass coating is less than 4 μm thick.

5. A lens component according to claim 1, wherein one of said lens elements is a glass lens element.

6. A lens component according to claim 1 wherein the plastic lens element has an optical surface of a predetermined configuration; and said another lens element has an optical surface facing the optical surface of the plastic lens element and being of a configuration substantially complementary thereto.

7. The assembly of claim 1, wherein the another lens element is formed of glass.

8. The assembly of claim 1, wherein said another lens element is formed of an optical plastic.

9. A method of cementing a plastic lens element to another plastic lens element comprising:

(i) coating a first plastic lens element with a layer of thin glass coating;

(ii) coating a second plastic element with a layer of thin glass coating; and (iii) cementing said first glass coated plastic element to said second glass coated plastic element with glass coated surfaces facing one another as if one was cementing ordinary glass elements.

10. A method of cementing a plastic lens element to a glass lens element comprising:

(i) coating said plastic lens element with a layer of thin glass coating; and (ii) cementing said glass coating of said plastic lens element to said glass lens element, thereby cementing both elements to each other.

11. An optical assembly comprising:

a plastic optical component having a thin glass coating on its internal surface; and another optical component cemented to said glass coated plastic optical component.

12. An optical assembly according to claim 11, wherein said glass coated plastic optical component is cemented to an optical component made of glass.

13. An optical assembly according to claim 11, wherein said glass coated plastic optical component is cemented to another glass coated plastic optical component.

\* \* \* \* \*